United States Patent
Khee et al.

(10) Patent No.: US 8,404,303 B2
(45) Date of Patent: Mar. 26, 2013

(54) SEPARATED GRAY METAL AND TITANIUM NITRIDE SOLAR CONTROL MEMBERS

(75) Inventors: Yeo Boon Khee, Singapore (SG); Yisheng Dai, Santa Clara, CA (US); Sicco W. T. Westra, Los Altos Hills, CA (US)

(73) Assignees: Solutia Singapore Pte. Ltd., Singapore (SG); Southwall Technologies, Inc., St. Louis, MO (US)

( * ) Notice: Subject to any disclaimer, the term of this patent is extended or adjusted under 35 U.S.C. 154(b) by 1967 days.

(21) Appl. No.: 11/524,992

(22) Filed: Sep. 21, 2006

(65) Prior Publication Data

US 2008/0074738 A1    Mar. 27, 2008

(51) Int. Cl.
*B05D 5/06* (2006.01)
*B05D 3/00* (2006.01)
*B32B 15/08* (2006.01)

(52) U.S. Cl. ......... 427/164; 427/209; 427/322; 428/457

(58) Field of Classification Search .................. None
See application file for complete search history.

(56) References Cited

U.S. PATENT DOCUMENTS

| | | | |
|---|---|---|---|
| 4,799,745 A | 1/1989 | Meyer et al. ................ 350/1.7 |
| 5,513,040 A | 4/1996 | Yang | |
| 6,034,813 A | 3/2000 | Woodard et al. ............ 359/360 |
| 6,083,628 A * | 7/2000 | Yializis ........................ 428/463 |
| 6,123,986 A | 9/2000 | Maschwitz et al. ........... 427/162 |
| 6,188,512 B1 | 2/2001 | Woodard et al. ............ 359/359 |
| 6,632,513 B1 | 10/2003 | Choi et al. ..................... 428/216 |
| 6,707,610 B1 | 3/2004 | Woodard et al. ............ 359/582 |
| 2006/0055308 A1 | 3/2006 | Lairson et al. ................ 313/489 |

OTHER PUBLICATIONS

XP-000983033 titled "Transition Metal Nitride Films for Optical Applications" by carl G. Ribbing and Arne Roos, Solid State Physics, Dept. o f Materials Science, Uppsala University, Uppsala, Sweden, SPIE vol. 3133, 027-786X, pp. 148-162.

* cited by examiner

*Primary Examiner* — Monique Jackson
(74) *Attorney, Agent, or Firm* — Schneck & Schneck; David Schneck

(57) ABSTRACT

A solar control member for determining solar control for a window includes an optically massive layer between a gray metal layer and a titanium nitride layer. The optically massive layer has sufficient thickness to retard or prevent constructive and destructive interference of reflected light. The optically massive layer may be an adhesive, but also may be one or more polymeric substrates. The gray metal layer is preferably nickel chromium, but other gray metal materials provide superior results as compared to the prior art. Also in the preferred embodiment, the titanium nitride layer is closer to the window (e.g., glass) than the gray metal layer.

5 Claims, 5 Drawing Sheets

SEPARATED GRAY METAL AND TITANIUM NITRIDE SOLAR CONTROL MEMBERS

TECHNICAL FIELD

The invention relates generally to solar control members and more particularly to providing solar control for a window.

BACKGROUND ART

The use of films to control the levels of reflection and transmission of a window at different frequency ranges of light is known in the art. For vehicle windows and many windows of buildings and residences, glare is reduced by controlling transmissivity of visible light ($T_{VIS}$) and reflectivity of visible light ($R_{VIS}$) at wavelengths between 400 nm and 700 nm. For the same window applications, heat load may be reduced by partially blocking solar transmission ($T_{SOL}$) in one or both of the visible portion of the solar spectrum and the near infrared (700 nm to 1200 nm) portion.

One known sequence of films for providing solar control is shown in FIG. 1 and is described in U.S. Pat. No. 6,034,813 to Woodard et al., which is assigned to the assignee of the present invention. In FIG. 1, a solar control arrangement of films is attached to a glass substrate 12 by a pressure sensitive adhesive (PSA) 14. Originally, the solar control arrangement is formed on a flexible polyethylene terephthalate (PET) substrate 16. The solar control arrangement includes a Fabry-Perot interference filter 18, an adhesive layer 20, a gray metal layer 22, another PET substrate 24, and a hardcoat layer 26. The second adhesive layer 20 is used when the Fabry-Perot interference filter 18 is formed on one PET substrate 16, while the gray metal layer 22 is formed on the second PET substrate 24.

The Fabry-Perot interference filter 18 provides solar load reduction by preferentially passing light at certain wavelengths and reflecting light at other wavelengths. An example of a Fabry-Perot interference filter is described in U.S. Pat. No. 4,799,745 to Meyer et al. This patent describes a virtually transparent, infrared reflecting Fabry-Perot interference filter that is characterized by transparent metal layers spaced apart by dielectric layers of a metal oxide. The gray metal layer 22 of FIG. 1 contributes to the final optical properties of the arrangement. The Woodard et al. patent states that the gray metal layer is preferably formed of a metal or alloy, such as nickel chromium having a thickness in the range of 2 nm to 20 nm. The gray metal layer should be sufficiently thick to partially block the transmission of visible light through the film.

Another known optical arrangement is described in U.S. Pat. No. 6,707,610 to Woodard et al., which is also assigned to the assignee of the present invention. With reference to FIG. 2, an optical arrangement is shown as being adhered to glass 28 by a PSA 30. For example, the glass may be a windshield of a vehicle or a window of a building or home. The PSA layer 30 is sandwiched between the glass and a first PET substrate 32. On the opposite side of the PET substrate is a slip layer 34. An optical coating of titanium nitride has a thickness selected primarily for achieving desired optical characteristics, such as solar control. A nickel chromium layer 38 is described as being a damage-retardation layer. Rather than nickel chromium, other gray metal materials may be used. Atop the titanium nitride layer 36 is a laminating adhesive 40, a second PET substrate 42, and one or more protective layers 44, such as a hardcoat or anti-scratch layer.

In the design of optical arrangements for windows, optical considerations and structural considerations must be addressed. Tailoring transmissivity and reflectivity on the basis of wavelength provides advantages. For example, it is typically beneficial to have higher reflectivity in the infrared range than in the visible range of the spectrum. Within the visible range, color neutrality is often desired. Color neutrality should not vary with the angle of view and should not change with age. Regarding structural stability, reducing the susceptibility of coatings to cracking during fabrication, installation, or long-term use is an important consideration. During fabrication, films are exposed to high temperatures and pressures. During installation, cracks may develop as a consequence of bending, such as when a flexible coated PET substrate is bent to follow the contour of a windshield. When a coated polymeric substrate having a titanium nitride layer is flexed, the titanium nitride layer has a tendency to crack.

While the prior art approaches operate well for their intended purpose, further advances are sought.

SUMMARY OF THE INVENTION

A solar control member formed in accordance with the invention includes an optically massive layer between a gray metal layer designed to achieve desired optical properties and a titanium nitride layer configured to cooperate with the gray metal layer to achieve a target solar performance. The solar control member is particularly useful for window applications, such as vehicle windows and windows for residences and buildings.

As used herein, the term "optically massive layer" is defined as a layer that is sufficiently thick to retard or prevent constructive and destructive interference of reflected light. Thus, the optically massive layer is distinguishable from a layer or a layer stack that is optically active and from a layer or a layer stack that is optically passive as a consequence of being thin (such as a slip layer). In one embodiment, the optically massive layer is a substrate, such as a PET substrate. Alternatively, the optically massive layer is a thick adhesive layer for bonding the titanium nitride layer to the gray metal layer. The gray metal layer and titanium nitride layer preferably physically contact the opposite sides of the optically massive layer. Where the center layer is a substrate that originally includes another material, such as a coating of a slip agent, the additional materials are preferably removed, such as using a burn-off process of exposing the substrate to glow discharge.

Also in the preferred embodiment, the gray metal layer is nickel chromium. Nickel chromium has been determined to provide desirable results in this application. Other gray metals or their alloys that provide acceptable results include stainless steel, inconel, monel, aluminum, nickel and chromium. In a less preferred embodiment, oxides of these materials may be used. Also in a less preferred embodiment, the gray metal may be silver, gold or copper, if the layer is sufficiently thin.

It has been determined that the combination of the titanium nitride layer and the gray metal layer on opposite sides of the optically passive layer achieves a desirable solar performance when used in window applications. As compared to a dual nickel chromium film equivalent, the invention has a more selective transmission spectra with higher infrared reflection.

DETAILED DESCRIPTION

Figure 3:
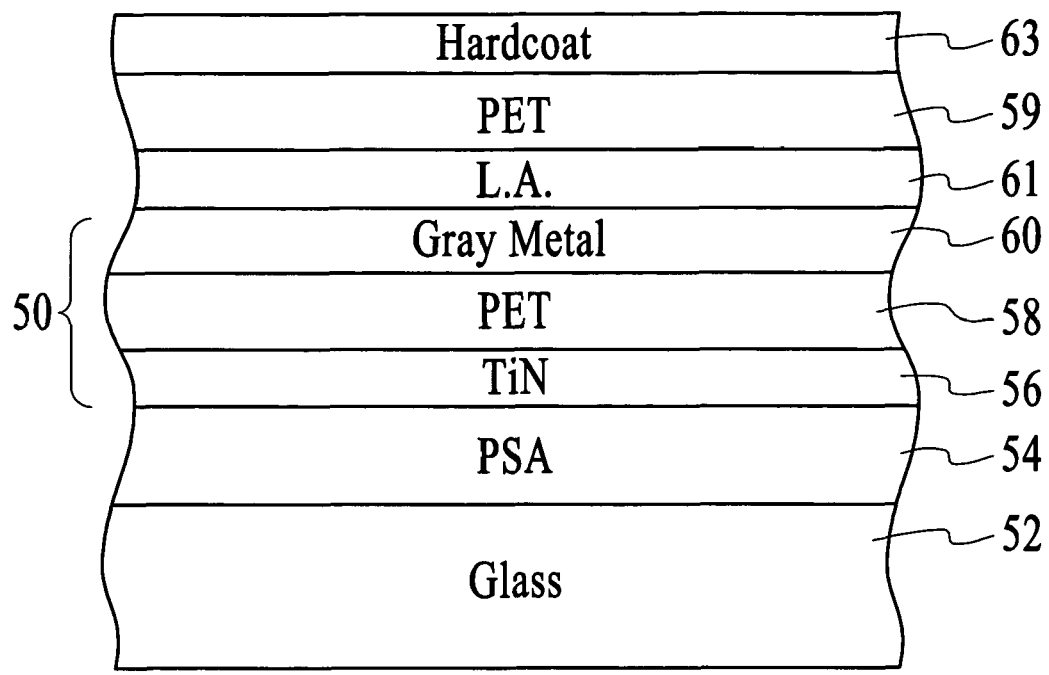
FIG. 3 is a sectional view of a solar control member attached to glass in accordance with one embodiment of the invention.

With reference to FIG. 3, a solar control member 50 is shown as being attached to glass 52 by a pressure sensitive adhesive (PSA) 54. In this embodiment, the solar control member is formed of a titanium nitride layer 56, a PET substrate 58, and a gray metal layer 60. The PET substrate 58 is sufficiently thick to be an "optically massive layer." That is, the thickness is such that constructive and destructive interference of reflected light is retarded. The PET substrate should be generally transparent and should have a thickness of at least 25 microns. The thickness of the gray metal layer is preferably less than 15 nm (between 2 nm and 15 nm), while the thickness of the titanium nitride layer is preferably in the range of 5 nm to 25 nm (and most preferably between 12 nm and 22 nm). The thickness of the laminating adhesive 82 is at least 5 microns. It has been determined that spacing a titanium nitride layer from a gray metal layer as shown in FIG. 3 provides superior solar performance when compared to other dual layer arrangements or even solar arrangements requiring many more layers. Test results will be presented in paragraphs that follow.

In the embodiment of FIG. 3, the titanium nitride layer 56 and the gray metal layer 60 may be formed on opposite sides of the PET substrate 58, such as by sputter deposition. To protect the gray metal layer from exposure following subsequent installation to the glass 52, a second PET substrate 59 is attached to the solar control member 50 using a laminating adhesive 61. A protective layer, such as a hardcoat 63, may be added.

Figure 1:
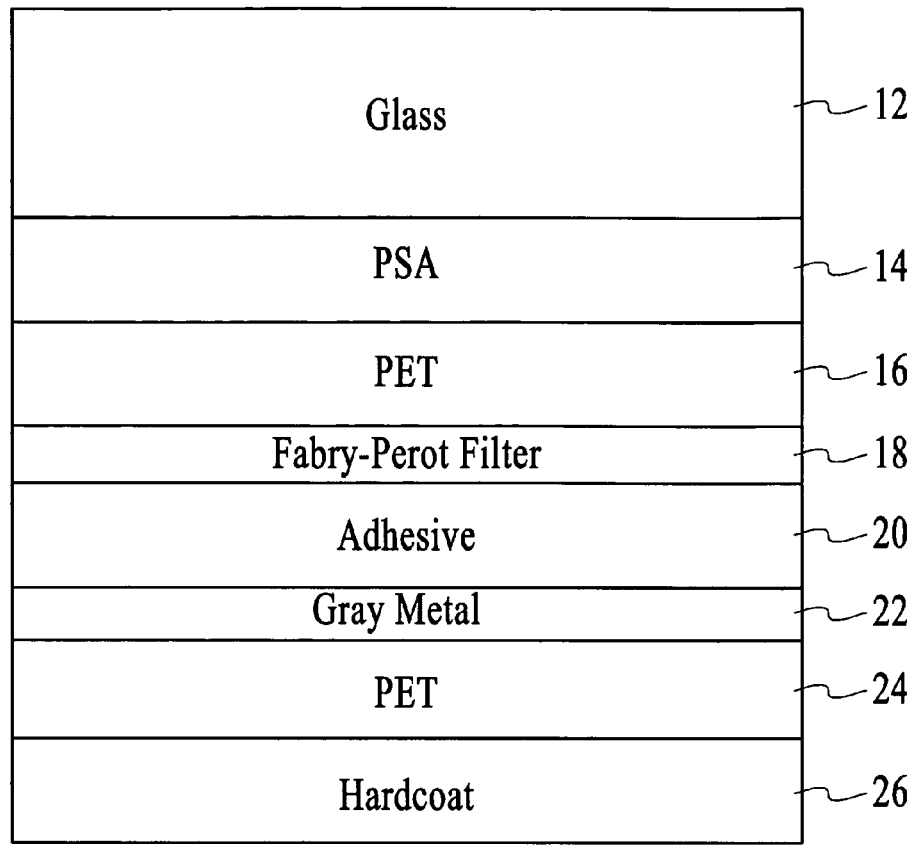
FIG. 1 is a sectional view of an optical member in accordance with the prior art.
Figure 2:
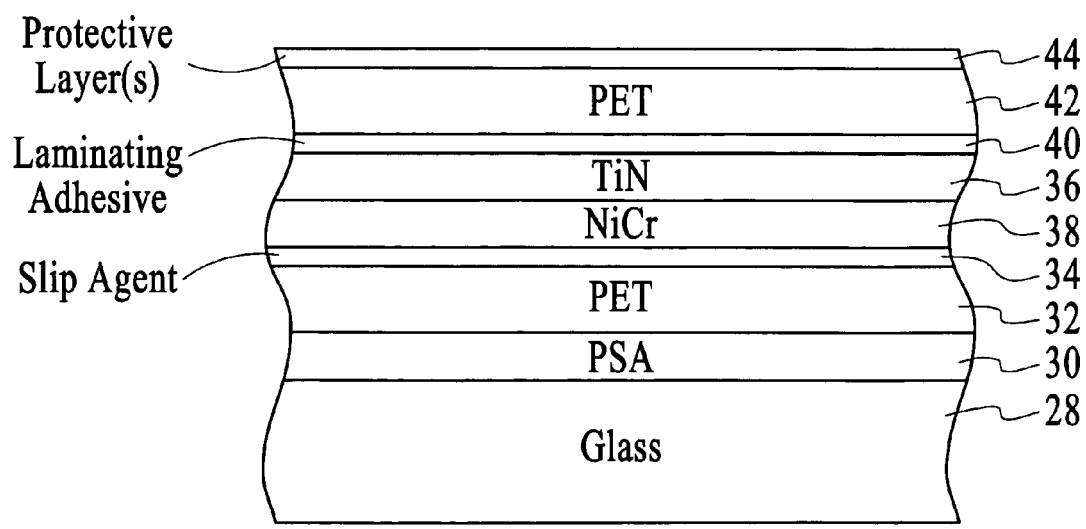
FIG. 2 is a sectional view of an optical arrangement in accordance with a second prior art approach.
Figure 4:
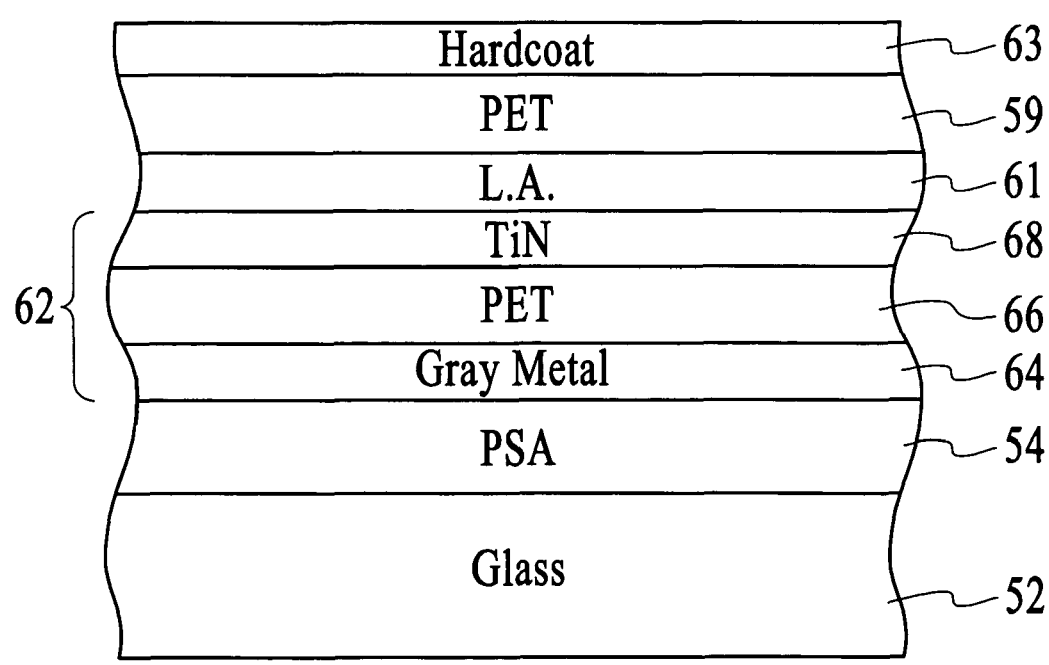
FIG. 4 is a sectional view of a second embodiment of the invention.

A second embodiment of the invention is shown in FIG. 4. The solar control member 62 of this embodiment is similar to that of FIG. 3, but the gray metal layer 64 of FIG. 4 is adjacent to the glass 52, while the titanium nitride layer 68 is the outermost layer within the solar control member. The "supporting layers" 54, 59, 61 and 63 are shown as being identical to those of FIG. 3. While test results show that the embodiment of FIG. 3 is preferred to that of FIG. 4, both embodiments have advantages as compared to prior art approaches, such as the one shown in FIGS. 1 and 2.

Figure 5:
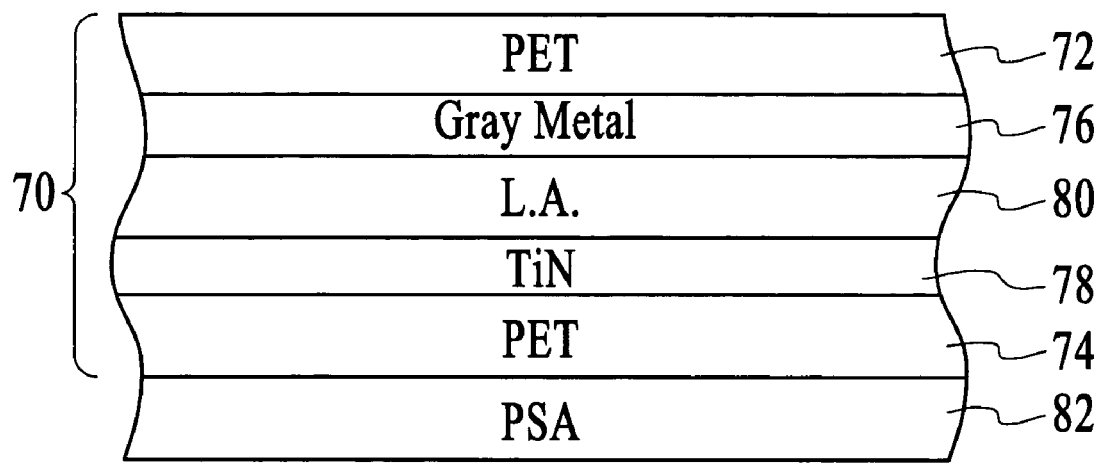
FIG. 5 is sectional view of a third embodiment of the invention, but prior to application to glass.

In FIG. 5, a solar control member 70 is shown as including a pair of PET substrates 72 and 74. The gray metal layer 76 may be initially sputtered on the PET substrate 72, with the titanium nitride layer 78 being sputtered onto the PET substrate 74 in a separate process. Then, an optically massive laminating adhesive layer 80 may be used to attach the two layers and their respective PET substrates. Simultaneously, the laminating adhesive layer 80 provides the desired physical and optical relationships between the gray metal layer and the titanium nitride layer. A PSA layer 82 is included for attaching the solar control member to glass.

Figure 6:
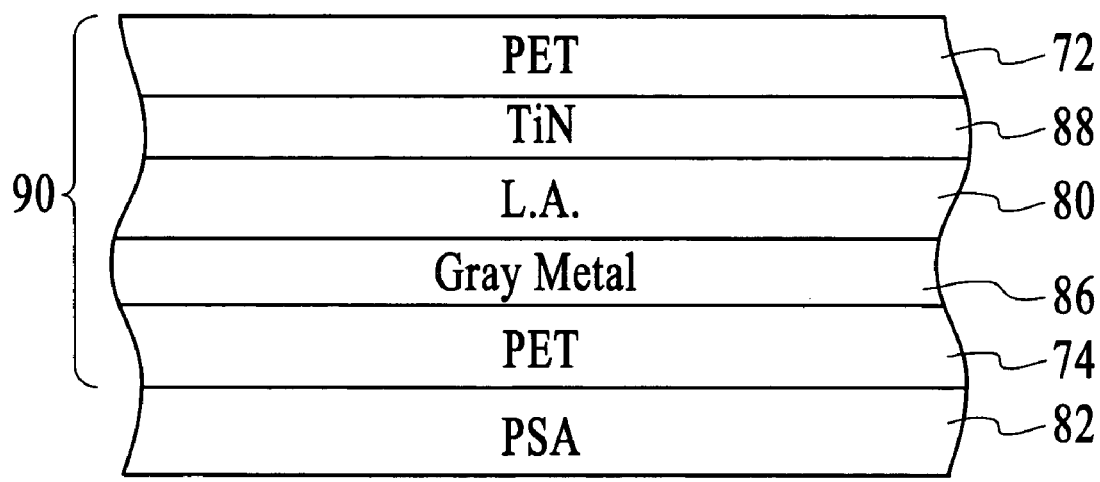
FIG. 6 is a fourth embodiment of the invention.

Solar control member 90 of FIG. 6 is similar to that of FIG. 5, but the positions of the gray metal layer 86 and the titanium nitride layer 88 are reversed. Thus, the gray metal layer will be closer to glass when the PSA 82 is used to attach the solar control member to glass.

As described with reference to the embodiments of FIGS. 3 and 4, the optically massive layer may be a polymer substrate, such as the PET substrates 58 and 66. On the other hand, FIGS. 5 and 6 illustrate embodiments in which the optically massive layer that separates the gray metal layer from the titanium nitride layer is an adhesive layer. While not shown in the drawings, a third alternative would be one in which the optically massive layer is a combination of substrate material and adhesive material. For example, if the two PET substrates 72 and 74 are attached directly by an adhesive, so that the gray metal and titanium nitride layers 76 and 78 sandwich the substrates and the adhesive, then the "optically massive layer" will comprise the two substrates and the adhesive. In such an embodiment, the gray metal or titanium nitride layer will be the outermost layer, so that it would be necessary to provide protection against exposure. Such protection may be provided using the laminated PET substrate 59 and hardcoat layer 63 shown in the embodiments of FIGS. 3 and 4.

The solar control members 50, 62, 70 and 90 of FIGS. 3-6 may be attached to vehicle windows, as well as business or residential windows. While the windows will be described as being glass, the invention may be used with other types of transparent substrates that are used to form windows.

A key improvement in each of the solar control members illustrated in FIGS. 3-6 relates to the use of the optically massive layer between the titanium nitride and gray metal layer. Particularly if the optically massive layer is a laminating adhesive, this layer serves the function of a "shock absorber" to absorb a portion of the mechanical energy that may be impacted on the solar control member. Such mechanical energy may be the result of installation and heat shrinking of the solar control member onto glass 52, as shown in FIGS. 3 and 4. It has also been determined that the structures of the gray metal layer and the titanium nitride layer of a solar control member in accordance with the invention reduce the susceptibility of the member to cracking and "hide" cracking if it does occur. The effectiveness of "hiding" cracking depends upon the side from which the coated glass is viewed, relative to the source of light. By laminating the layer of gray metal, a darker solar control member can be achieved as compared to using a single titanium nitride layer or even a dual thick titanium nitride layer, thus reducing the susceptibility to cracking (persons skilled in the art will recognize that the gray metal layer will have this effect). By selecting the proper thickness of the titanium nitride layer, cracking can be controlled and a desirable solar performance can be achieved. In one embodiment, the limiting thickness of the titanium nitride layer is one in which transmissivity to light is forty-two percent. Then, the thickness of the gray metal layer is selected such that the transmissivity to visible light ($T_{VIS}$) is at a target level. The titanium nitride layer may be designed to provide the desired solar rejection properties, while the gray metal layer is designed to provide the lower $T_{VIS}$.

In the preferred embodiment, the gray metal layer is nickel chromium. In the description which follows, the gray metal layer will be described primarily with reference to this embodiment. However, other acceptable gray metals include stainless steel, inconel, monel, aluminum, nickel, chromium and their alloys. In a less preferred embodiment, oxides of these materials may be used. Also in a less preferred embodiment, the gray metal may be silver, gold or copper, if the layer is sufficiently thin.

A number of samples were fabricated and tested in order to determine the advantages of the invention. In Table 1, eleven samples are shown, with the optical measurements for a different sample being listed in eleven columns of the table.

TABLE 1

|  | T51G60 | T51G50 | T35G60 | T35G50 | G60T51 | G50T51 | G60T35 | G50T35 | SampA | SampB | SampC |
|---|---|---|---|---|---|---|---|---|---|---|---|
| $T_{VIS}$ | 36.78 | 31.61 | 25.55 | 22.18 | 36.45 | 31.90 | 22.14 | 25.76 | 39.94 | 33.06 | 15.42 |
| $R_{VIS}$ | 10.40 | 11.15 | 17.53 | 15.84 | 10.68 | 11.15 | 16.09 | 13.23 | 9.49 | 10.55 | 16.74 |
| $T_{SOL}$ | 28.24 | 24.79 | 17.85 | 15.99 | 28.16 | 25.09 | 15.84 | 18.16 | 39.79 | 33.16 | 17.87 |
| $R_{SOL}$ | 11.92 | 12.28 | 20.98 | 19.84 | 11.18 | 11.32 | 16.62 | 14.61 | 8.39 | 9.11 | 13.17 |
| $A_{SOL}$ | 59.84 | 62.93 | 61.16 | 64.17 | 60.66 | 63.59 | 67.54 | 67.23 | 51.82 | 57.73 | 68.96 |
| SR | 0.56 | 0.58 | 0.66 | 0.67 | 0.55 | 0.58 | 0.66 | 0.64 | 0.46 | 0.51 | 0.64 |
| SC | 0.52 | 0.49 | 0.40 | 0.39 | 0.52 | 0.49 | 0.40 | 0.42 | 0.63 | 0.57 | 0.42 |
| $T_{980}$ | 24.13 | 20.94 | 13.49 | 12.23 | 24.19 | 21.69 | 12.00 | 13.87 | 38.33 | 32.22 | 20.78 |

The first four samples represent the embodiment shown in FIG. 5, which includes the titanium nitride layer 56 closer to the glass 52 than the gray metal layer 60. In each of these samples, the letter "T" represents titanium nitride, the letter "G" represents gray metal, and the numbers represent the transmissivities of the individual layer. In the next four samples, the embodiment of FIG. 6 is represented, since the gray metal layer 64 is closer to the glass 52 than the titanium nitride layer 68 (i.e., the gray metal "G" is identified before the titanium nitride "T"). The uses of the letters "T" and "G" and the use of the numbers are consistent with the uses for the first four samples. The final three samples are for purposes of evaluation, since they do not represent the invention. The three samples with marketing names SampA, SampB and SampC are dual gray metal layers having nominal visible light transmissions of thirty-seven percent, twenty-eight percent and fourteen percent, respectively.

In Table 1, $T_{VIS}$ is the transmissivity of visible light, while $R_{VIS}$ is the reflectance within the visible light portion of the light spectrum. Reflectance parameters are measured from the glass side of the sample. $T_{SOL}$ is solar transmissivity and $R_{SOL}$ is solar reflectivity. $A_{SOL}$ is a measure of solar absorptivity. Transmissivity at the wavelength 980 nm was also measured ($T_{980}$).

In Table 1, "SC" is the shading coefficient, which refers to the heat gain obtained when an environment is exposed to solar radiation through an opening having a given area, as compared to the heat gain obtained through the same area fitted with a 3.2 mm single pane clear glass (ASHRAE standard calculation method). Finally, "SR" refers to solar rejection.

Figure 7:
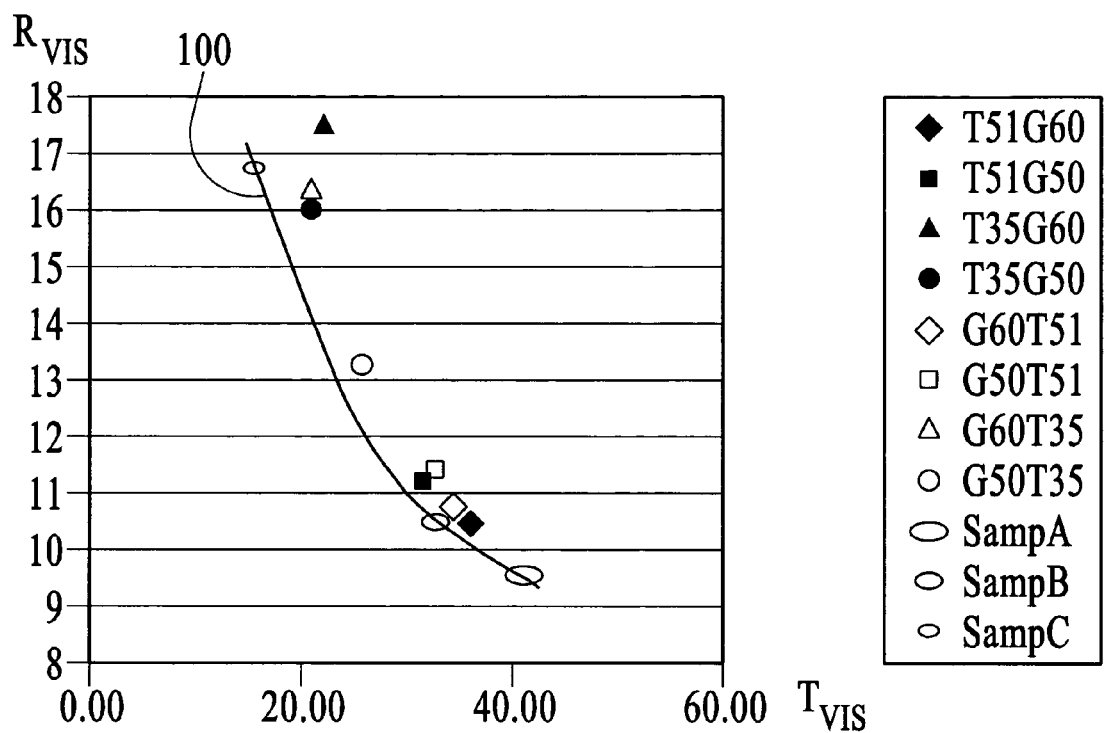
FIGS. 7-10 are plots of measured optical performances of samples formed to test the benefits of the invention.
Figure 8:
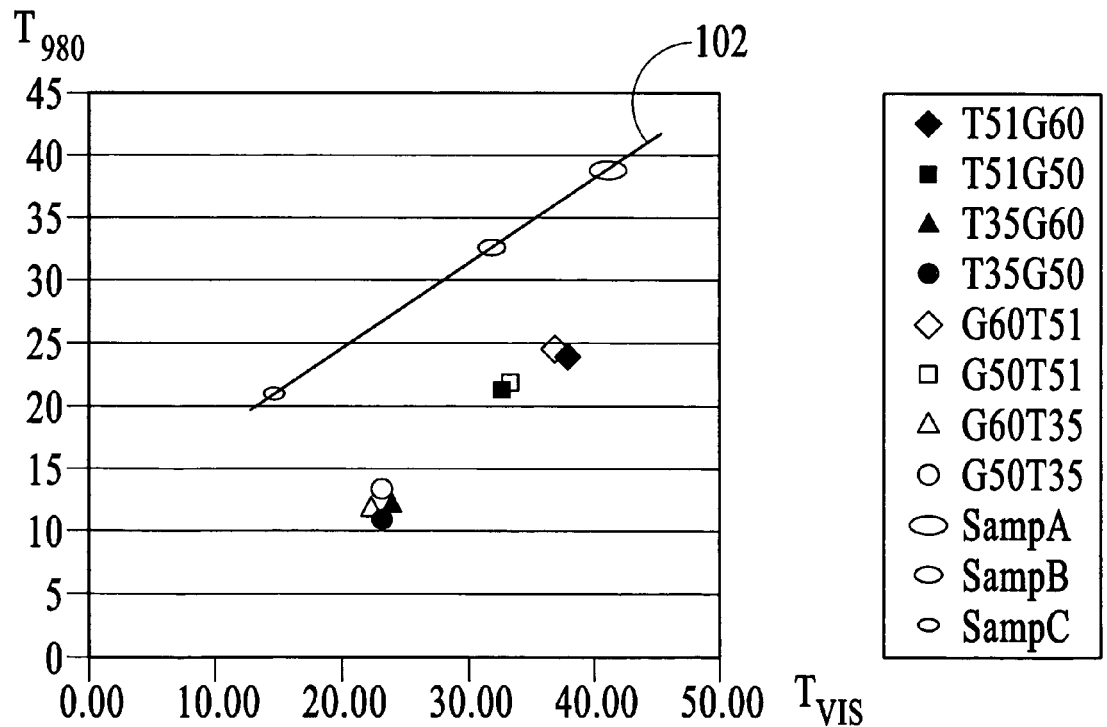
Figure 9:
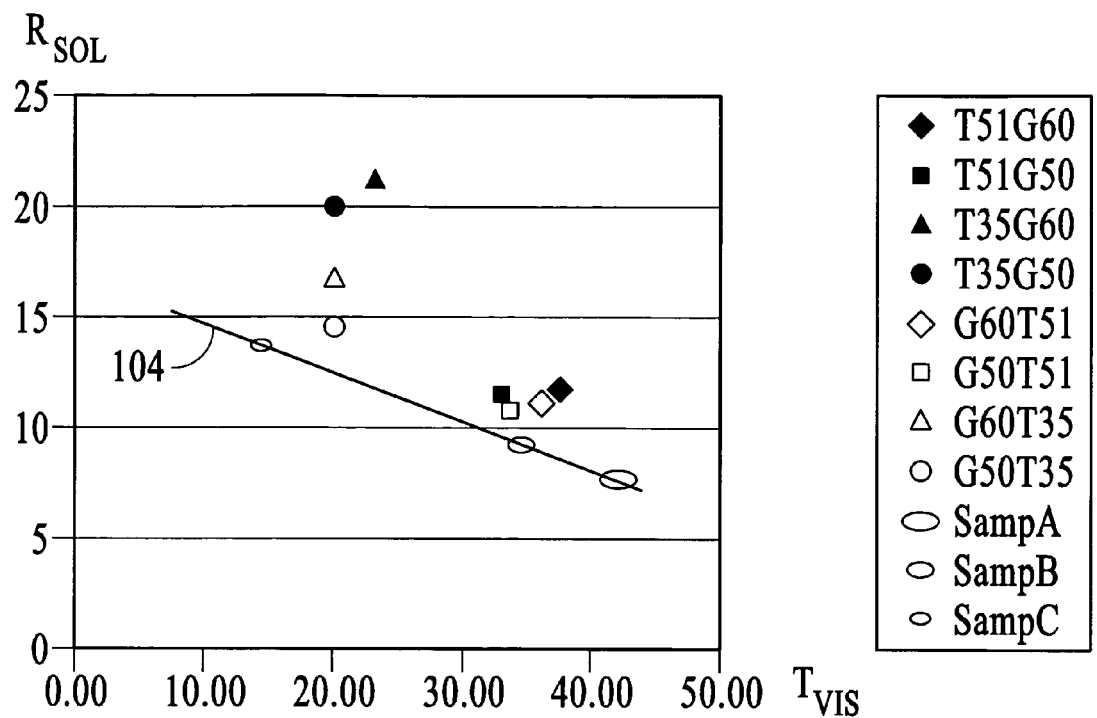
Figure 10:
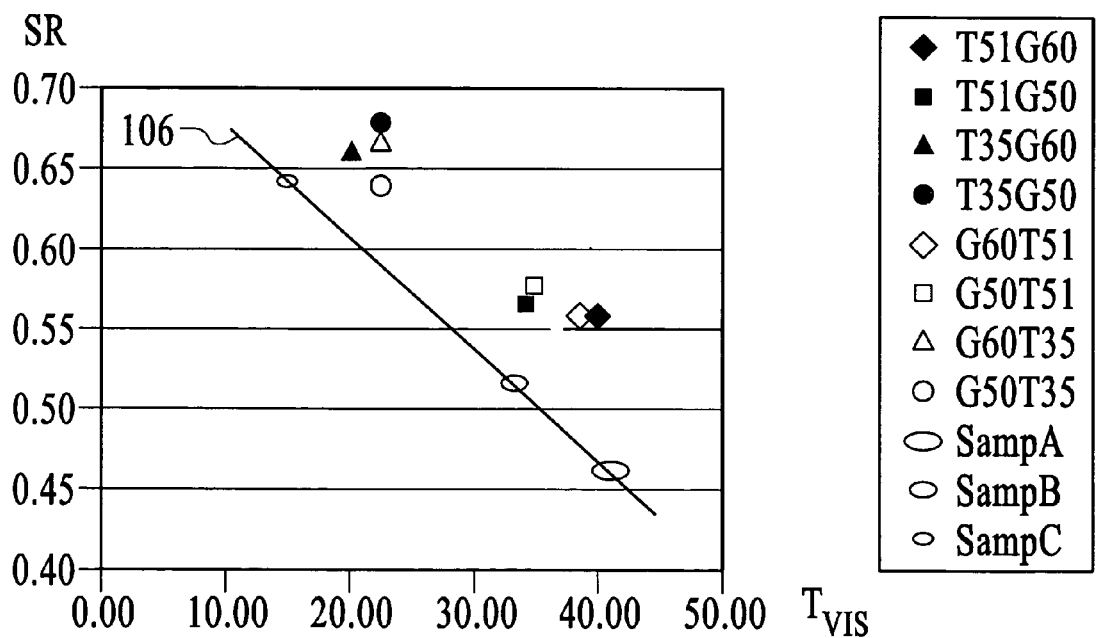

FIGS. 7, 8, 9 and 10 plot some of the relationships from Table 1. In FIG. 7, $T_{VIS}$ is shown along the X axis, while $R_{VIS}$ is plotted along the Y axis for the eleven samples. The line 100 connects the three plots for the dual nickel chromium samples (SampA, SampB and SampC). The eight samples in accordance with the invention all have an improved ratio of $T_{VIS}$-to-$R_{VIS}$. Similarly, in FIG. 8, a line 102 connects the three plots for the dual nickel chromium samples with respect to the ratio of $T_{VIS}$ to $T_{980}$, and all of the plots for the samples in accordance with the invention show superior performance. In FIGS. 9 and 10, $T_{VIS}$ values are plotted as a function of solar reflectance and solar rejection, respectively. Again, the values for the eight samples in accordance with the invention are all on a preferred side of a line 104 and 106 connecting the three plots for the dual nickel chromium samples.

Based upon Table 1 and FIGS. 7-10, it can be seen that the combination of the gray metal layer G60 with T51 brings a slightly lower $T_{VIS}$ as compared to the dual nickel chromium layer SampA (G60 layer in combination with another G60 layer). Moreover, the $R_{VIS}$ value is slightly increased, due to the reflective nature of T51. Visible light reflectance of T51 and G60 are similar, so the reversal of the sequence of the films has little effect on the reflectance on the combination. That is, T51G60 has a reflectance similar to that of G60T51.

T35 is very reflective with respect to both visible light and total solar energy. When combined with either G60 or G50, the $T_{VIS}$ of the combination is reduced to the range of twenty-two percent to about twenty-five percent and the $R_{VIS}$ is raised to approximately seventeen percent. Whenever the T35 layer is adjacent the glass, the $R_{VIS}$ tends to be higher, because there is no blocking of the reflected light by the absorbing nickel chromium layer.

As applied to glazing, solar rejection (SR) is a performance parameter that is indicative of the total solar energy rejected by the glazing system. This performance parameter is the sum of two aspects of rejected solar energy, namely reflected radiation energy and the solar energy absorbed by the glazing system. Since a portion of the absorbed solar energy is re-radiated from the heated glass surface, only a fraction of the absorbed solar energy contributes to SR. In an inexact estimate, the solar energy is calculated from the equation: $SR = R_{SOL}$ (solar energy reflection) $+ 0.73 * A_{SOL}$ (solar energy absorption). A high SR value is desirable for a solar control member, since a higher SR value indicates that more energy is being blocked from passing through glass to the interior of a vehicle, a building or a residence. As shown in FIG. 10, the solar rejection values of samples configured in accordance with the invention are significantly higher than the dual gray metal samples for approximately 0.06. An improvement of greater than ten percent is achieved.

Also indicated in Table 1 and FIGS. 7-10 is the fact that as compared to dual nickel chromium film equivalents, the combination of titanium nitride and nickel chromium has a more selective transmission spectra, with high infrared reflection. The replacement of nickel chromium with titanium nitride reduces infrared transmission at 980 nm. Titanium nitride/nickel chromium combinations have approximately ten percent less infrared transmission than dual nickel chromium films having the same $T_{VIS}$ level.

With the titanium nitride layer being closer to the glass than the nickel chromium layer, the solar reflectance at similar $T_{VIS}$ values surpasses the dual nickel chromium films (SampA, SampB and SampC). The high solar rejection is more significant when T35 is used. At the $T_{VIS}$ level of twenty-five percent, the $R_{SOL}$ of T35G60 can be as high as twenty-one percent. The solar rejection follows this same trend. The solar rejection (SR) value for titanium nitride with nickel chromium shows approximately 0.6 higher than the dual nickel chromium films at similar $T_{VIS}$ values.

With lighter titanium nitride film (T51), the influence of the sequence of titanium nitride/nickel chromium on reflectance in both visible and infrared is insignificant. In such a situation, the nickel chromium layer is preferably placed as the layer closer to the glass than the titanium nitride, so as to partially cover visual defects on the titanium nitride layer. This provides the advantage of potentially "hiding" any cracking of the titanium nitride layer by use of the gray metal layer as the film closest to the glass, so as to buffer the reflectance and visible cracks of the titanium nitride layer. As previously noted, the effectiveness of this "hiding" is dependent upon the side of the glass that is viewed relative to a source of illumination.

In the preferred embodiment, the titanium nitride and gray metal layers of the present invention are sputter deposited. Techniques for sputter deposition are known in the art.

What is claimed is:

1. A method of providing a solar control member comprising:

forming a gray metal layer on a first side of an optically massive layer comprising a transparent substrate including selecting and configuring said gray metal layer to achieve target optical properties at said first side:

reducing reflectivity of visible light while retaining control over visible cracking by forming a titanium nitride layer on a side of said optically massive layer opposite to said first side; and removing a slip agent from said transparent substrate prior to forming said gray metal layer and said titanium nitride layer on opposite sides of said transparent substrate.

2. The method of claim 1 wherein forming said titanium nitride layer includes limiting said titanium nitride layer to being the only solar control layer on said second side of said optically massive layer.

3. The method of claim 2 wherein forming said gray metal layer includes limiting said gray metal layer to being the only solar control layer on said first side of said optically massive layer.

4. The method of claim 1 wherein forming said gray metal layer and forming said titanium nitride layer include depositing said layers onto opposite sides of a transparent polymeric substrate and in direct contact with said substrate.

5. The method of claim 1 further comprising configuring said solar control member for attachment to a window such that said titanium nitride layer is closer to said window than is said gray metal layer.

* * * * *